(12) United States Patent
Saarinen et al.

(10) Patent No.: US 6,697,483 B1
(45) Date of Patent: Feb. 24, 2004

(54) METHOD AND APPARATUS FOR SEARCHING A DATABASE

(75) Inventors: Tarvo Saarinen, Tampere (FI); Timo Luukkanen, Kangasala (FI); Tarmo Jukarainen, Hampulankatu (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/187,709

(22) Filed: Nov. 6, 1998

(30) Foreign Application Priority Data

Jul. 7, 1997 (FI) .................................................. 974166

(51) Int. Cl.[7] .............................................. H04M 1/00
(52) U.S. Cl. .................................. 379/354; 379/355.02
(58) Field of Search ........................... 379/354, 355.05, 379/355.07, 356.01; 707/3

(56) References Cited

U.S. PATENT DOCUMENTS

| | | | |
|---|---|---|---|
| 4,453,217 A | 6/1984 | Boivie | 364/300 |
| 5,224,205 A | 6/1993 | Dinkin et al. | 395/200 |
| 5,457,738 A * | 10/1995 | Sylvan | 379/354 |
| 5,479,476 A | 12/1995 | Finke-Anlauff | 379/58 |
| 5,586,261 A | 12/1996 | Brooks et al. | 395/200.02 |
| 5,745,680 A | 4/1998 | Brooks et al. | 395/200.02 |
| 5,786,819 A | 7/1998 | Weiser et al. | 345/354 |
| 5,809,115 A | 9/1998 | Inkinen | 379/93.05 |
| 5,812,954 A | 9/1998 | Henriksson | 455/550 |
| 5,819,175 A | 10/1998 | Niemi | 455/418 |
| 5,930,703 A | 7/1999 | Cairns | 455/418 |
| 5,982,876 A * | 11/1999 | Albesa | 379/354 |
| 6,502,090 B1 * | 12/2002 | Raisanen | 707/3 |

FOREIGN PATENT DOCUMENTS

| | | | |
|---|---|---|---|
| EP | 0 457 077 A2 | 11/1991 | |
| EP | 0 624 965 A2 | 11/1994 | |
| EP | 0 755 142 A2 | 1/1997 | |
| EP | 876036 A2 * | 11/1998 | H04M/1/274 |
| EP | 0 876 036 A2 | 11/1998 | |
| WO | WO 93/14589 | 7/1993 | |

OTHER PUBLICATIONS

European Search Report, dated Sep. 11, 2000, 3 pages.
Finnish Official Action.

* cited by examiner

*Primary Examiner*—Minsun Oh Harvey
*Assistant Examiner*—Jefferey Harold
(74) *Attorney, Agent, or Firm*—Perman & Green, LLP

(57) ABSTRACT

A method of searching an electronic phonebook of a cellular phone, where the phonebook contains a multiplicity of names each being made up of one or more alphanumeric characters. The method comprises defining a search template by selecting a letter from a displayed list of the alphabet. The set of distinct data strings, present at the beginning of stored names, which commence with said template and which differ from one another by only their final character, are then identified. The user then selects one of said set of data strings as a new search template. If the number of names matching the new search template is less than some predefined number, then those names are displayed. If not, then the process is repeated using the new extended template.

14 Claims, 3 Drawing Sheets

(A)        (B)

(C)        (D)

(E)        (F)

(G)        (H)

(I)

METHOD AND APPARATUS FOR SEARCHING A DATABASE

FIELD OF THE INVENTION

The present invention relates to a method and apparatus for searching a database and is applicable in particular to databases which contain a multiplicity of memory entries where each memory entry is made up of one or more alphanumeric characters.

BACKGROUND OF THE INVENTION

A common feature of modern telephones, both cellular and land-line, is the provision of an electronic phonebook or database which contains a list of phonebook entries, each entry comprising a telephone number and identification details, e.g. name and address, associated with the number. Typically, the user is able to scroll through this list on a display of the telephone to select a desired one of the entries. By then pressing a call activation key, the user is able to automatically dial the telephone number of the selected entry.

When a large number of entries are stored in an electronic phonebook, the search method described above becomes relatively time consuming, e.g. if a user wishes to locate the number belonging to a name which begins with the letter "p", then it is necessary to scroll through many entries in the phonebook before that name and number are found.

Several methods have been implemented in cellular telephones to allow a user to quickly focus a search on a particular portion of a stored electronic phonebook. One commonly used method involves a user entering one or more characters, present at the beginning of the name for which he is searching, into the memory of the phone. The entered character or characters define a search "template" and, after the user has pressed an "action" key, all of those names which begin with a data string matching the search template, are provided to the telephone's display. The user can scroll through the matched names to select the required name.

In a modification to the above search method, following entry of each individual character, the phonebook is automatically searched to identify those names which begin with a data string matching the search template so far defined. As each new character is entered by the user, the displayed list is automatically focused in accordance with the new template. At any time, the user can scroll through the currently displayed list to select one of the displayed names.

It will be appreciated that the search methods discussed above require the provision of a set of alphanumeric keys by means of which a user can define the search template. However, in some cases, alphanumeric keys may not be provided on the telephone in order to reduce the size of the device. In other cases, alphanumeric keys may be covered by a flap or other cover in the normal use condition of the phone. It is of course impossible to employ the above described search method with the former type of phone, whilst it is often inconvenient to employ it with the latter.

SUMMARY OF THE INVENTION

It is an object of the present invention to provide a method and apparatus for searching an electronic database containing a multiplicity of memory entries, and which does not require the use of alphanumeric data entry keys to perform the searching method.

According to a first aspect of the present invention there is provided a method of searching an electronic database containing a multiplicity of memory entries, each memory entry being made up of one or more data characters, the method comprising the steps of:

(a) defining a search template containing at least one character;

(b) identifying the set of distinct data strings, present at the beginning of memory entries, which commence with said template and which differ from one another by only their final character;

(c) selecting one of said set of data strings and defining the selected string as a new search template; and either (d) identifying the or each memory entry commencing with the new template; or (e) repeating the method from step (b) using the new template.

The method of the present invention allows a specific entry, in an electronic database, to be located simply and quickly without necessarily using alphanumeric keys. Moreover, users may learn to use the method quickly and no detailed training process is required.

Preferably, step (a) comprises displaying on a display a list of characters and selecting one character from the displayed list as an initial search template. The list of characters is preferably a list of the alphabet. More preferably, said selection is made by scrolling through the displayed list until a desired character is identified.

Preferably, step (b) comprises providing the identified data strings to a display, and displaying the data strings as a scrollable list. Step (c) may then comprise selecting said one data string by scrolling through the list of data strings until the desired string is identified. Where one of said distinct data strings identified in step (b) is present in only one of the memory entries, that data string may be extended on the display such that the entire memory entry, or that much of the entry which can be displayed, is displayed. For those data strings which are present in more than one memory entry, an indication of this property may be displayed on the display beside these data strings.

Preferably, step (d) is performed when the number of memory entries commencing with the search template is less than a predefined number, e.g. six. If the number of entries commencing with the search template is equal to or greater than this predefined number, then step (e) is performed.

The method of the present invention is applicable in particular, though not necessarily, to the searching of an electronically stored phonebook, where each memory entry comprises an identifier such as a name and a telephone number is associated with each memory entry.

According to a second aspect of the present invention there is provided apparatus comprising:

an electronic memory for storing a multiplicity of memory entries, where each memory entry is made up of one or more data characters;

at least one user actuatable key for allowing a user to define a search template containing at least one character;

processing means for identifying the set of distinct data strings, present at the beginning of stored memory entries, which commence with said template and which differ from one another by only their final character;

an electronic display for displaying said set of data strings as a scrollable list;

at least one user actuatable key for enabling a user to select a data string from said list, said processing means being arranged in use to define the user selected string as a new search template.

Preferably, the processing means, which may be a microprocessor or the like, is arranged to repeat the identification of distinct data strings using the new search template. The user is in this way able to focus the search in a stepwise manner.

Preferably, the apparatus comprises at least one scroll key which allows a user to scroll backwards and forwards through the list of displayed distinct data strings. A further key may be provided for selecting one of said data strings as the new search template.

The apparatus according to the second aspect of the present invention may be a mobile telephone, combined mobile telephone/personal digital assistant, or similar mobile communications apparatus, in which the memory entries together provide an electronic phonebook. Alternatively, the apparatus may be a personal digital assistant or notebook computer.

BRIEF DESCRIPTION OF THE DRAWINGS

For a better understanding of the present invention and in order to show how the same may be carried into effect reference will now be made, by way of example, to the accompanying drawings, in which.

DETAILED DESCRIPTION

Figure 1:
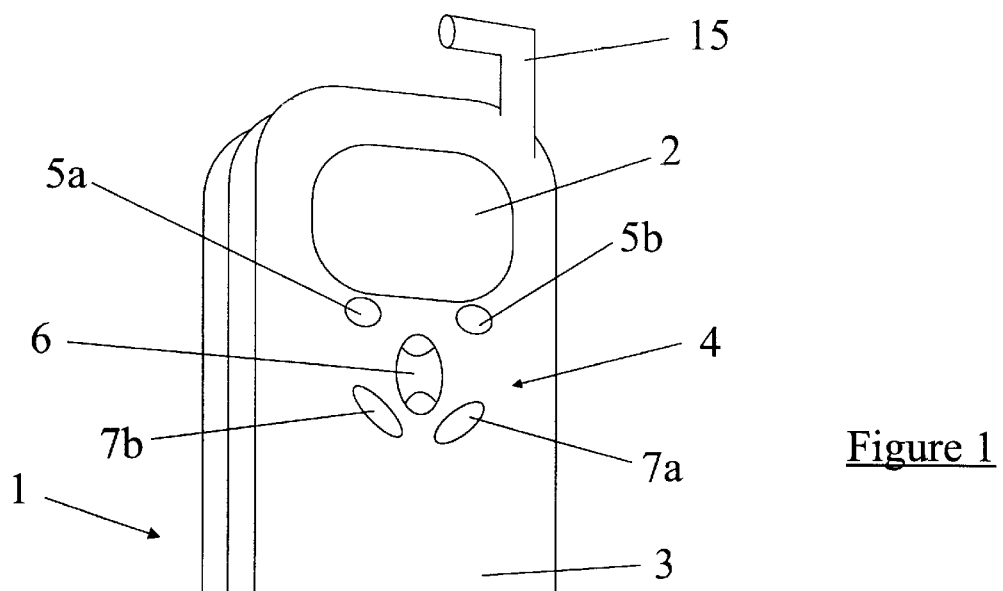
FIG. 1 shows a front perspective view of a combined mobile telephone/personal digital assistant device in a closed configuration.
Figure 2:
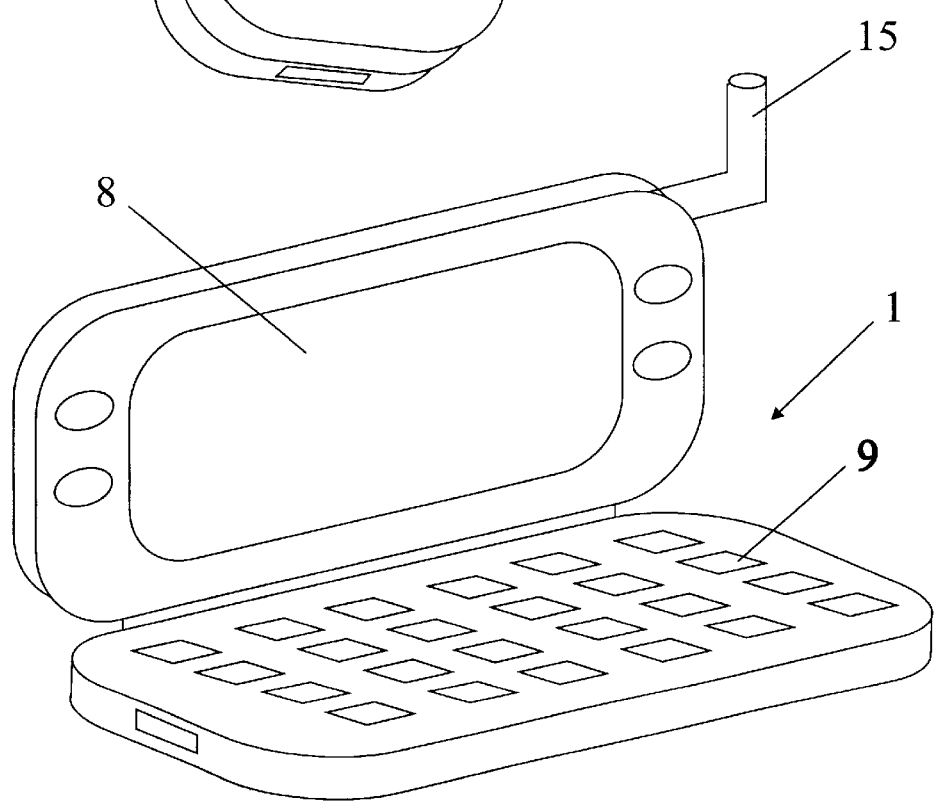
FIG. 2 shows the device of FIG. 1 in an open configuration.

The device 1 shown in FIGS. 1 and 2 is a combined mobile telephone/personal digital assistant and comprises a liquid crystal display (LCD) 2 provided on its front surface 3. Also provided on the front surface 3 is a keypad 4 which consists of a pair of left and right menu selection keys 5a,5b, an up/down scroll key 6 which is of the rocker type, and on-hook and off-hook keys 7a,7b. The device has a "clamshell" configuration, and a second LCD 8 is provided on one of the internal surface of the device 1. On the other internal surface, a QWERTY style keypad 9 is provided.

Figure 3:
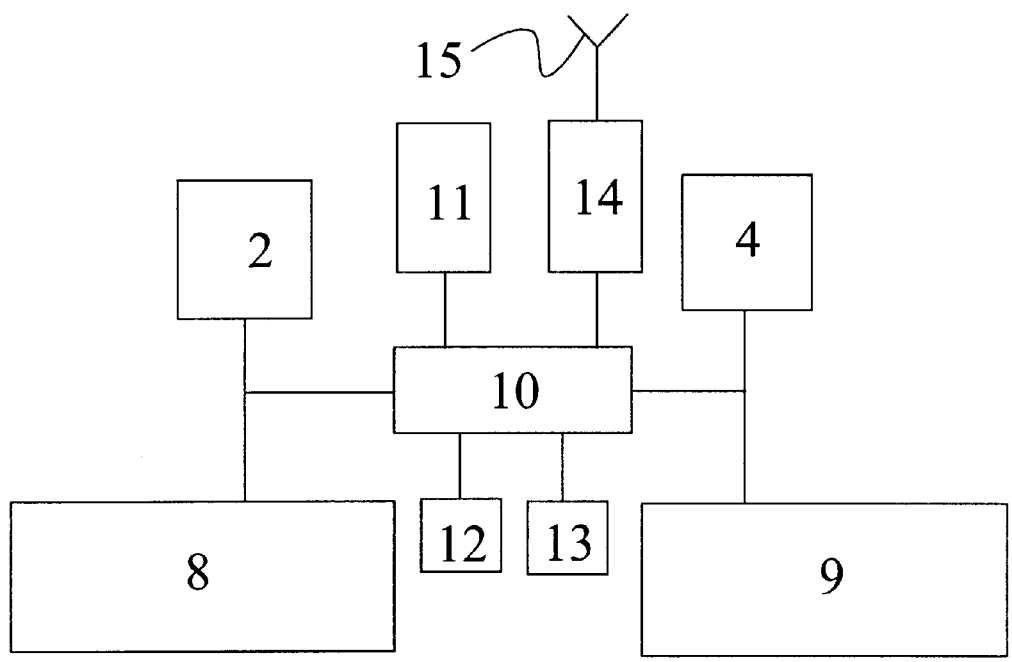
FIG. 3 shows schematically the architecture of the device of FIGS. 1 and 2.

The general architecture of the device 1 of FIG. 1 is shown schematically in FIG. 3. The device 1 has a central processing unit (CPU) 10 which is coupled to the LCD displays 2,8, the keypads 4,9, and one or more memory devices 11. The CPU 10 is also coupled to a microphone 12 and loudspeaker 13 of the device 1 and to a radio frequency (RF) unit 14 which communicates with an antenna 15. This architecture is known and will not be explained in any further detail.

The memory device 11 is arranged to store an electronic phonebook comprising a list of names and respective telephone numbers. The names usually consist of a Christian name and a surname and/or a business name. This data is typically entered by the user using the QUERTY keypad 9 and the LCD display 8. The user may also access this data using the same internal keypad and display, e.g. to make a telephone call to a desired number.

Such an operation can only be performed when the device 1 is in the open configuration. When the device 1 is closed, as is the case when the device 1 is mounted in a cradle of a car-kit, the user does not have direct access to the internal keypad 9. However, he should be able to conduct a search of the database for a required telephone number using only the keys of the external keypad 4. The CPU 10 is controlled, in accordance with a program stored in the memory device 11 of the device, to enable this search in accordance with the following description.

Figure 4:
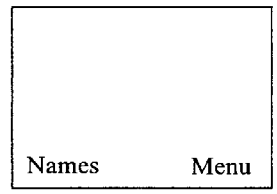
FIGS. 4A to 4I show a number of display screens of the device of FIGS. 1 to 3.
Figure 4:
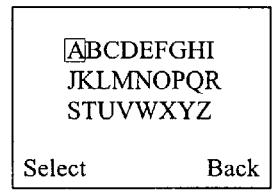
Figure 4:
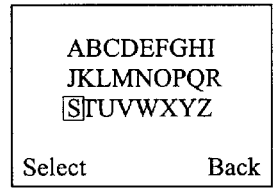
Figure 4:
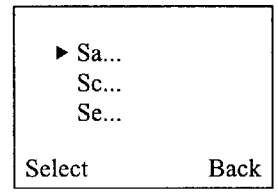
Figure 4:
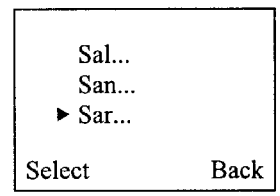
Figure 4:
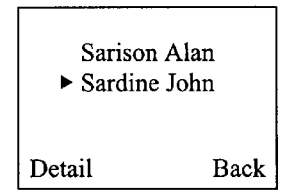
Figure 4:
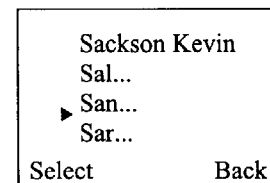
Figure 4:
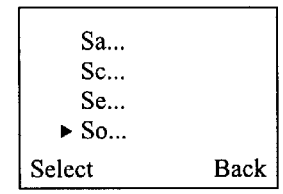
Figure 4:
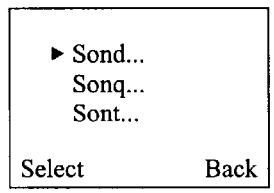

The LCD display 2 displays the screen of FIG. 4A in normal use, where "Names" and "Menu" are displayed above the left and right soft keys 5a,5b respectively. The user commences a phonebook search by pressing the left soft key 5a to select the "Names" option. This results in the display displaying the screen of FIG. 4B in which all of the letters of the alphabet A to Z are displayed. A square block surrounding the letter "A" indicates "A" is the currently selected (default) letter. "Select" and "Back" options are presented above the left and right soft keys 5a,5b.

Consider the case where the user wishes to find the phonebook entry for "John Sardine". The user selects the letter "S" from the displayed list of letters by advancing the square block through the list, using the up/down scroll key 6, until the block surrounds the letter "S" (FIG. 4C), and then pressing the left soft key 5a to "Select" that letter as an initial search template. The CPU 10 then conducts a search of the names contained in the phonebook to identify those names which begin with the letter "S". Suppose that the names identified are: Salminen; Salmond; Sandford; Sandy; Sarison; Sardine; Scales; Scansel; Scott; Seamen; Sears; Sepponen. All distinct two letter data strings, present at the beginnings of these names are then determined, i.e. "Sa", "Sc", "Se", and displayed as shown in FIG. 4D.

The user can then further focus the search by scrolling through the displayed list of two letter data strings, using the up/down soft key 6, to identify the string which matches the first two letters of the desired phonebook entry, in this case "Sa" (indicated by an arrow to the left of the character string). The user selects this string as a new search template by pressing the left "Select" soft key 5a. It will be appreciated that it may not be possible to display all of the distinct two letter strings on the display 2 at the same time. In this case, the list is scrolled across the display as the up/down key 6 is actuated.

The CPU 10 then repeats the search process, this time identifying those names in the phonebook which begin with the selected two letter data string "Sa", i.e.: Salminen; Salmond; Sandford; Sandy; Sarison; Sardine. All distinct three letter data strings, present at the beginnings of these names, are then determined and displayed, i.e. "Sal", "San", "Sar", (FIG. 4E). The user can then select the "Sar" string as a new search template using the up/down key 6 and the left soft key 5a. As there are only two names now matching the selected string, these are both displayed (FIG. 4F). By depressing the left soft key 5a, details stored under the name "Sardine" are displayed, e.g. phone number, address etc.

At this stage, the user may also initiate a call to "Sardine" by scrolling to that name and then pressing the off-hook key 7b. If more than one telephone number is stored for "Sardine", then pressing the off-hook key may cause these numbers to be listed on the display (not shown in the Figures). The user is then prompted to make a selection from this list. At any stage in the process described above, the user can return to the previously displayed screen by selecting the "Back" option with the right soft key 5b.

In order to maximise the efficiency of the phonebook search, Christian names are searched separately, in addition to searching surname/Christian name combinations, so that the user can enter details of either name when conducting the search. Address details and other information associated with a phonebook entry may also be separately searched.

When data strings are identified which match only a single name in the phonebook, that name is displayed on the display 2 in its entirety (or at least as much of the name as can fit onto the display). So for example, if the name "Kevin Sackson" is added to the list of names given above, then the display of FIG. 4E would appear as shown in FIG. 4G. The fact that the other three letter strings are contained in more than one phonebook name is indicated by the presence of three dots ". . ." after the strings.

In cases where a data string is selected by the user, and that data string is contained in a number of phonebook names all of which are so alike that the next focusing step would produce only a single data string, the search process jumps one step further. For example, where the list of names given above additionally includes: Sondag, Sondberg, Sonquist, Sonquer, Sonter, Sontenen, the second focusing step would result in the display of FIG. 4H. If the user selects the string "So", then the user is no further forward in his search if the next display shows only "Son". The search therefore automatically jumps to the next character which distinguishes the remaining names matching the template. The display of FIG. 4I is then provided.

It will be appreciated by the person of skill in the art that modifications may be made to the above described embodiment without departing from the scope of the present invention. For example, when the number of names which match a selected string is less than some predefined number, for example six, then all of those matching names may be displayed.

It will also be appreciated that, whilst the above detailed description is concerned with an electronic phonebook of a cellular telephone, the present invention is applicable to any electronic database in which a large number of data entries are present.

What is claimed is:

1. A method of searching an electronic database containing a multiplicity of memory entries, each memory entry being made up of one or more data characters, the method comprising the steps of:
   (a) defining a search template containing at least one character;
   (b) identifying the set of distinct data strings, present at the beginning of memory entries, which commence with said template and which differ from one another by only their final character;
   (c) selecting one of said set of data strings and defining the selected string as a new search template; and either
   (d) identifying the or each memory entry commencing with the new template; or
   (e) repeating the method from step (b) using the new template.

2. A method according to claim 1, wherein step (a) comprises displaying on a display a list of characters and selecting one character from the displayed list as an initial search template.

3. A method according to claim 2, wherein the list of characters is a list of the alphabet.

4. A method according to claim 1, wherein step (b) comprises providing the identified data strings to a display, and displaying the data strings as a scrollable list.

5. A method according to claim 4, wherein step (c) comprises selecting said one data string by scrolling through the list of data strings until the desired string is identified.

6. A method according to claim 5, wherein, when one of said distinct data strings identified in step (b) is present in only one of the memory entries, that data string is extended on the display such that the entire memory entry, or that much of the entry which can be displayed, is displayed.

7. A method according to claim 6, wherein, for those data strings which are present in more than one memory entry, an indication of this property is displayed on the display beside these data strings.

8. A method according to claim 1, wherein step (d) is performed when the number of memory entries commencing with the search template is less than a predefined number and step (e) is performed when the number of entries commencing with the search template is equal to or greater than this predefined number.

9. A method according to claim 1, the method being applied to search an electronically stored phonebook.

10. Apparatus comprising:
   an electronic memory for storing a multiplicity of memory entries, where each memory entry is made up of one or more data characters;
   at least one user actuatable key for allowing a user to define a search template containing at least one character;
   processing means for identifying the set of distinct data strings, present at the beginning of stored memory entries, which commence with said template and which differ from one another by only their final character;
   an electronic display for displaying said set of data strings as a scrollable list;
   at least one user actuatable key for enabling a user to select a data string from said list,
   said processing means being arranged in use to define the user selectable string as a new search template.

11. Apparatus according to claim 10, wherein the processing means is arranged to repeat the identification of distinct data strings using the new search template.

12. Apparatus according to claim 10 and comprising at least one scroll key which allows a user to scroll backwards and forwards through the list of displayed distinct data strings.

13. Apparatus according to claim 10, wherein said apparatus is a mobile communications device.

14. Apparatus according to claim 10, wherein said apparatus is a mobile communications device, comprising at least one scroll key which allows a user to scroll backwards and forwards through the list of displayed distinct data strings.

* * * * *